US005534704A

United States Patent [19]

Robinson et al.

[11] Patent Number: 5,534,704

[45] Date of Patent: Jul. 9, 1996

[54] OPTICAL IMAGE CORRELATOR AND SYSTEM FOR PERFORMING PARALLEL CORRELATION

[75] Inventors: Michael G. Robinson, Oxfordshire; Peter C. H. Poon, London, both of United Kingdom

[73] Assignee: Sharp Kabushiki Kaisha, Osaka, Japan

[21] Appl. No.: 229,621

[22] Filed: Apr. 19, 1994

[30] Foreign Application Priority Data

Apr. 21, 1993 [GB] United Kingdom .................. 9308279

[51] Int. Cl.$^6$ .................................................. G02B 27/42

[52] U.S. Cl. .......................................... 250/550; 382/278

[58] Field of Search ............................. 250/550; 382/32, 382/42, 43, 277, 278, 280, 281

[56] References Cited

U.S. PATENT DOCUMENTS

| | | | |
|---|---|---|---|
| 3,211,898 | 10/1965 | Tomenko | 235/181 |
| 3,248,552 | 4/1966 | Bryan . | |
| 3,435,244 | 3/1969 | Burckhardt et al. | 250/550 |
| 4,826,285 | 5/1989 | Horner | 350/162.13 |
| 5,050,220 | 9/1991 | Marsh et al. | 382/4 |
| 5,131,055 | 7/1992 | Chao | 382/32 |
| 5,367,579 | 11/1994 | Javidi et al. | 382/31 |

FOREIGN PATENT DOCUMENTS

| | | |
|---|---|---|
| 1319977 | 6/1973 | United Kingdom . |
| 2228118 | 8/1990 | United Kingdom . |

OTHER PUBLICATIONS

Matsuoka et al, "Iterative Image Restoration by Means of Optical–Digital Hybrid System", Applied Optics, Dec. 15, 1982, vol. 21, no. 24, pp. 4493–4499.

*Primary Examiner*—Edward P. Westin
*Assistant Examiner*—Stephen Calogeno

[57] ABSTRACT

An optical image processor which may be used for optical image correlation comprises a liquid crystal spatial light modulator for displaying an input image as a two dimensional array of pixels. An array of photodetectors provides the output. Between the SLM and the photodetectors, there are provided a spatial light modulator and microoptic array of pin holes or lenses. The SLM has a respective picture element for each of the elements of the array and displays a filter or template image for correlation with the images displayed on the input SLM. Each photodetector of the array of output photodetectors views each of the pixels of the SLM via respective pin holes or lenses and pixels of the SLM and array. Thus, each photodetector receives light from the input through an array of pin holes or microlenses which, when selectively shuttered, act as a filter. The attenuation of the light intensity through the pixels of the SLM of the filter and the convergence of the light from the respective light paths on to a single photodetector represent multiplication and addition, respectively, corresponding to a discrete correlation integration function.

18 Claims, 6 Drawing Sheets

OPTICAL IMAGE CORRELATOR AND SYSTEM FOR PERFORMING PARALLEL CORRELATION

FIELD OF THE INVENTION

The present invention relates to an optical image processor. Such a processor may be used as incoherent adaptable optical image correlator. The present invention also relates to an optical image processing system and an optical image correlator.

DESCRIPTION OF THE RELATED ART

GB 1 319 977 discloses an information conversion system which makes use of an optical memory such as an exposed and developed photographic emulsion. An array of controllable light sources illuminates the optical memory, which has a memory element for each light source. Each memory element produces a light pattern on an array of photodetectors, which combine the light patterns to provide an output indicative of the state of illumination of the light sources. Such a system may be used to provide fixed coding or decoding of input signals to the light sources and is an optical equivalent of a programmed read only memory.

GB 2 228 118 discloses an optical processor comprising an array of input picture elements and an array of output photodetectors optically interconnected by an array of holographic or refractive elements. A spatial light modulator is located between the input and output arrays so as to control the optical interconnections. No example of an interconnection regime is disclosed.

SUMMARY OF THE INVENTION

An optical image correlator according to one embodiment of the present invention is provided which includes an array of optical detectors. The correlator further includes a first image forming means for forming a first array of X first image picture elements, where X is an integer greater than one, a set of optical path defining means, and a second image forming means for forming a second array of second picture elements. At least one of the first and second image forming means includes a spatial light modulator each of whose picture elements has an optical transmissivity which is independently controllable. Furthermore, the set of optical path defining means includes Y optical path defining means, where Y is an integer greater than one, and the second array comprises Y second image picture elements, each of which is arranged to modulate the optical path defined by a respective one of the optical path defining means. In addition, each of the optical detectors cooperates with a corresponding subset of the Y optical path defining means to define Zi optical paths between the optical detector and Zi of the first image picture elements, respectively, where Zi is an integer greater than one and less than or equal to X and each subset of the optical path defining means is different from all of the other subsets thereof.

According to a preferred embodiment of the present invention, each of the array of optical detectors, the first array, the set of optical path defining means, and the second array is a two dimensional array. Furthermore, in the preferred embodiment, the array of optical detectors is an A×B array, the first array is a C×D array, and each of the set of optical path defining means and the second array is an (A+C−1)×(B+D−1) array, where A, B, C, and D are integers greater than one.

According to the invention, there is provided an optical image processor as defined in the appended claim 1.

Preferred embodiments of the invention are defined in the other appended claims.

BRIEF DESCRIPTION OF THE DRAWINGS

The invention will be further described, by way of example, with reference to the accompanying drawings, in which.

Like reference numbers refer to corresponding parts throughout the drawings.

DETAILED DESCRIPTION OF THE PREFERRED EMBODIMENT

Figure 1:
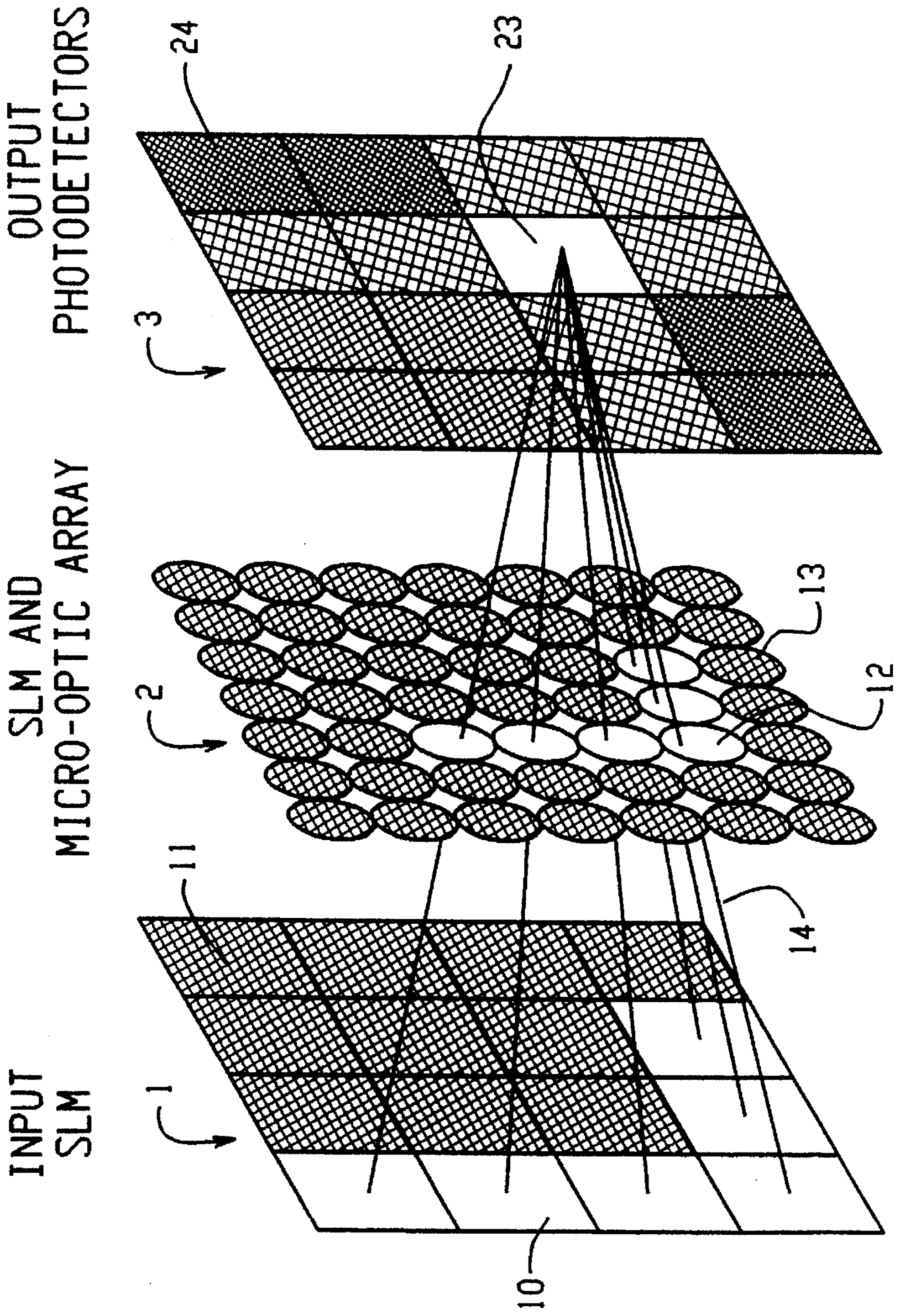
FIG. 1 is a schematic diagram of an optical image processor constituting an embodiment of the invention illustrating use as an optical image correlator presented with a first image.

The processor shown in FIG. 1 comprises a spatial light modulator (SLM 1) comprising a two dimensional array of picture elements (pixels). The optical transmissivity of each pixel is individually controllable so that the SLM 1 modulates a light source (not shown) with a two dimensional image. The processor further comprises a combined SLM and microoptic array 2 in the form of a two dimensional array of elements, each of which comprises a pixel of a SLM and a converging microlens or pin hole. The SLM and array 2 is disposed between the SLM 1 and a two dimensional array of photodetectors 3.

As shown in FIG. 1, the SLM 1 comprises a 4×4 array of pixels and the array of photodetectors 3 comprises a 4×4 array of detectors. The SLM and array 2 comprises a 7×7 array of elements arranged so that each of the photodetectors 3 views each of the pixels of the SLM 1 via respective elements of the SLM and array 2.

Figure 6:
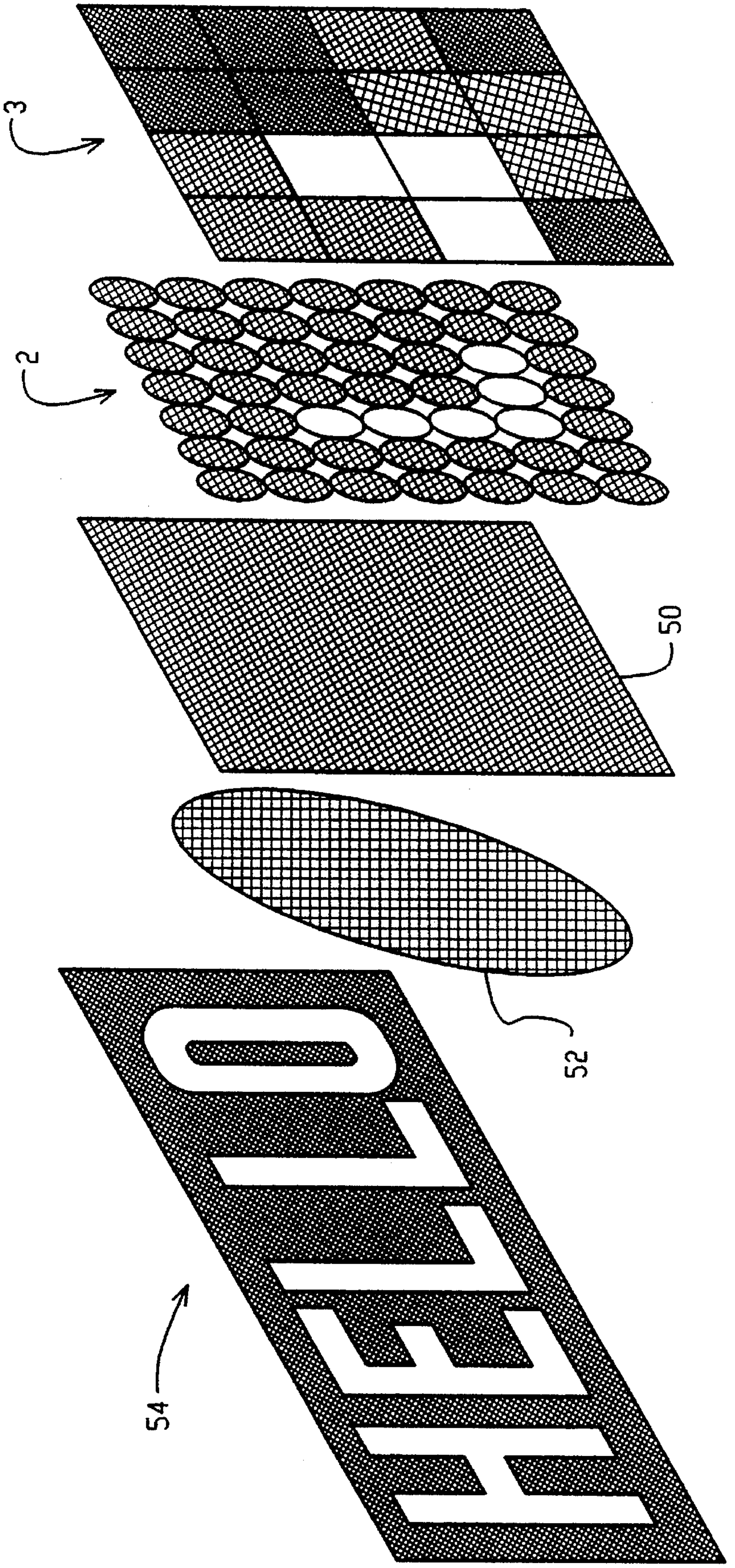

Correlation between two images is performed by displaying one image on the SLM which shutters the pin holes or microlenses of the SLM and micro optic array 2, and the other image on the SLM 1. In an alternative embodiment the SLM 1 is replaced by the image plane 50 of a lens 52 which directly views a scene 54 to be analysed as shown in FIG. 6. Such an alternative embodiment allows the data processing rate to be greater than the maximum frame rate of the SLM 1.

Light passes between the pixels of the SLM 1 and the photodetectors 3 of the array via the pin holes or lenses of the SLM and array 2 such that, for each output, there is a single pin hole or microlens for each of the pixels of the SLM 1. Thus, for each output, the light passes from the SLM 1 through an array of pin holes or microlenses which are effectively shuttered so as to act as a filter. The attenuation of the light intensity through the pixels of the SLM of the filter and the convergence of the light from the respective light paths on to a single photodetector 3 represent multiplication and addition, respectively, corresponding to a discrete correlation integration function. Because each pin hole or microlens does not uniquely connect optically a single pixel of the SLM 1 with a single photodetector 3, the detection of the filtered input at each photodetector 3 is related, by translation of the filter, to that detected by neighbouring photodetectors. Thus, the output of each photodetector 3 represents the correlation of an input image with a uniquely translated version of a filter plane image, so that correlation is calculated optically for all relative shifts, within the physical limitations of the processor, of the input and filter images simultaneously. Where the array of photodetectors 3 is embodied as a charge coupled device (CCD) array, the output optical intensity representing the correlation output information may be obtained using conventional temporal multiplexing techniques.

FIG. 1 illustrates correlation of identical input and filter images. The input image is represented by unshaded pixels such as 10 and shaded pixels such as 11 on the SLM 1. Similarly, the filter image is represented by unshaded elements such as 12 and shaded elements such as 13 of the SLM and array 2. The unshaded elements present minimum attenuation to light whereas the shaded elements are opaque. The passage of light (or other optical radiation) to one 23 of the photodetectors 3 is illustrated by lines such as 14 showing the optical pathways through the processor.

The density of shading of the photodetectors 3 indicates the relative outputs of the photodetectors. Thus, the photodetector 23 receives the most light and represents the correlation peak of the correlation between the input and filter images. The black shaded photodetectors such as 24 receive no light. Others of the photodetectors receive an amount of light between the maximum and no light, and the two dimensional output of the photodetectors 3 represents the correlation function of the input and filter images with respect to vertical and horizontal relative translations between the images.

Figure 2:
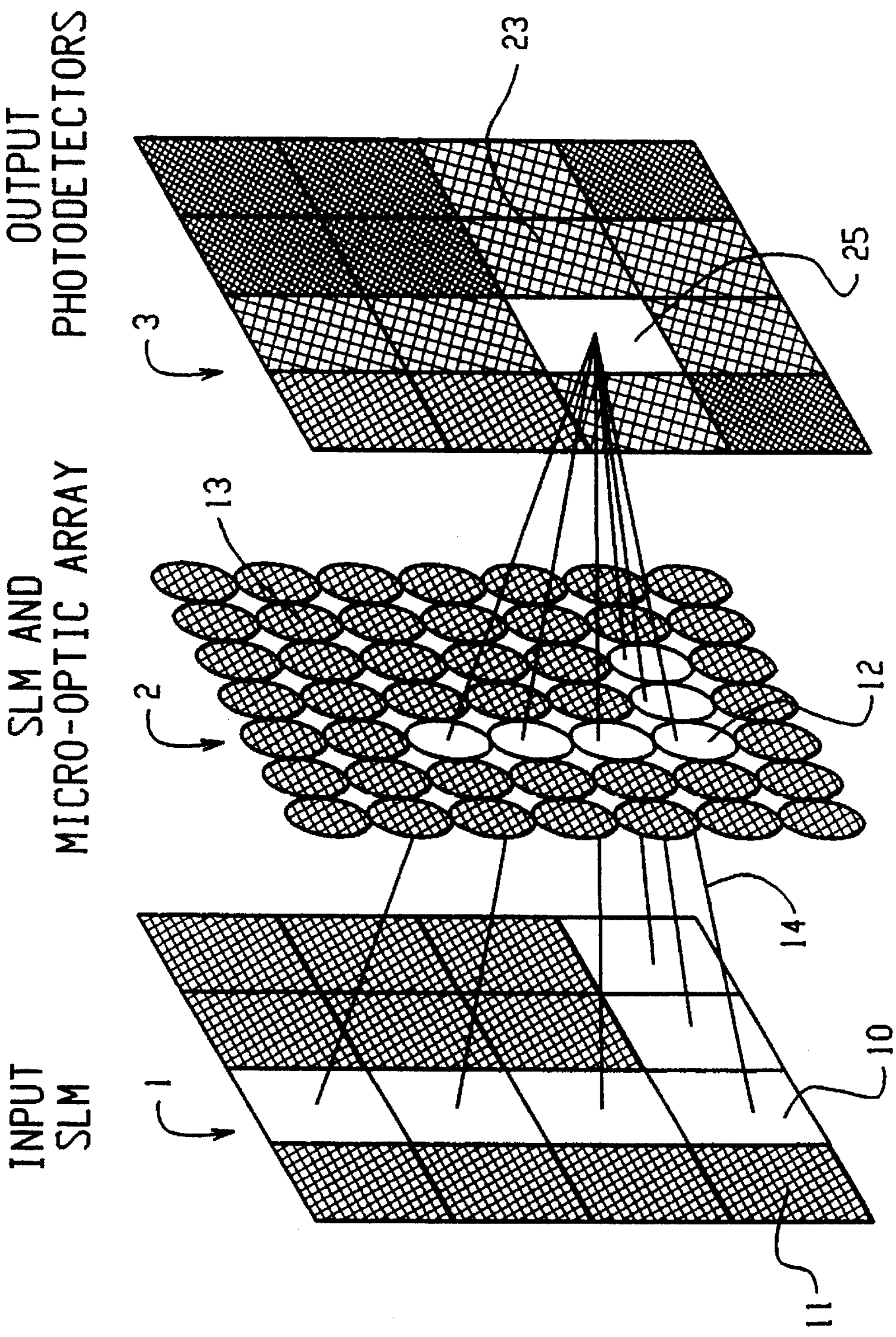
FIG. 2 is a schematic diagram of the processor of FIG. 1 presented with a laterally shifted image.

FIG. 2 illustrates the correlation function for the situation where the input image displayed by the SLM 1 is translated by one column of pixels rightwardly and into the plane of the drawing, whereas the filter image displayed by the SLM and array 2 is unaltered as compared with FIG. 1. As shown by the shading of the photodetectors 3, the spatial correlation function is displaced by one column of photodetectors to the left and out of the plane of the drawing as compared with the correlation function shown in FIG. 1. The peak of the correlation function now occurs at the photodetector 25 which is laterally adjacent the photodetector 23.

The optical image correlator may be used to provide image correlation for the purposes of pattern recognition. For instance, a predetermined filter image may be displayed by the SLM and array 2 and various input images presented while monitoring the photodetectors 3 for one or more predetermined two dimensional correlation functions. Alternatively, the processor may be "trained" to provide a predetermined correlation function whenever a predetermined input image is presented irrespective of its position, and possibly orientation, on the SLM 1 or in the image of an optical system in the alternative embodiment mentioned hereinbefore. For this purpose, the processor may be trained in a way which resembles training of numeral processing systems.

For this purpose, the array of pixels of the SLM 1 and the array of photodetectors 3 may be treated as the input and output arrays of neurons of a neural network and the system may be considered as a constrained totally interconnected network in which each input is connected to each output but not uniquely. The shuttering of the pin holes or microlenses may be considered as a waiting of the interconnections such that neural network learning algorithms used to train interconnection weightings can be modified and used to determine the optimum filter image for pattern or feature recognition. However, the limitations of the interconnection constraints must be recognised so that associations which cannot be performed by the system are not used to train it.

When such training is utilised, "negative" values of the filter image would enhance the performance of the system, as in the case of neural networks. Implementation of negative values requires bipolar channel implementation and may use techniques of the type, for instance, disclosed in EP-A-0 579 356. For instance, one possible implementation would be to introduce bipolar polarisorion channels and use a polarisorion modulator array for the filter image, which represents the interconnection weightings. Each of the detectors 3 is then required to detect both components separately, for instance by duplicating the detectors and providing orthogonal polorisers side by side within the area of a single "output pixel" of the photodetector array. The correlation output is then provided by the difference of the intensities detected by the paired detectors.

Figure 3:
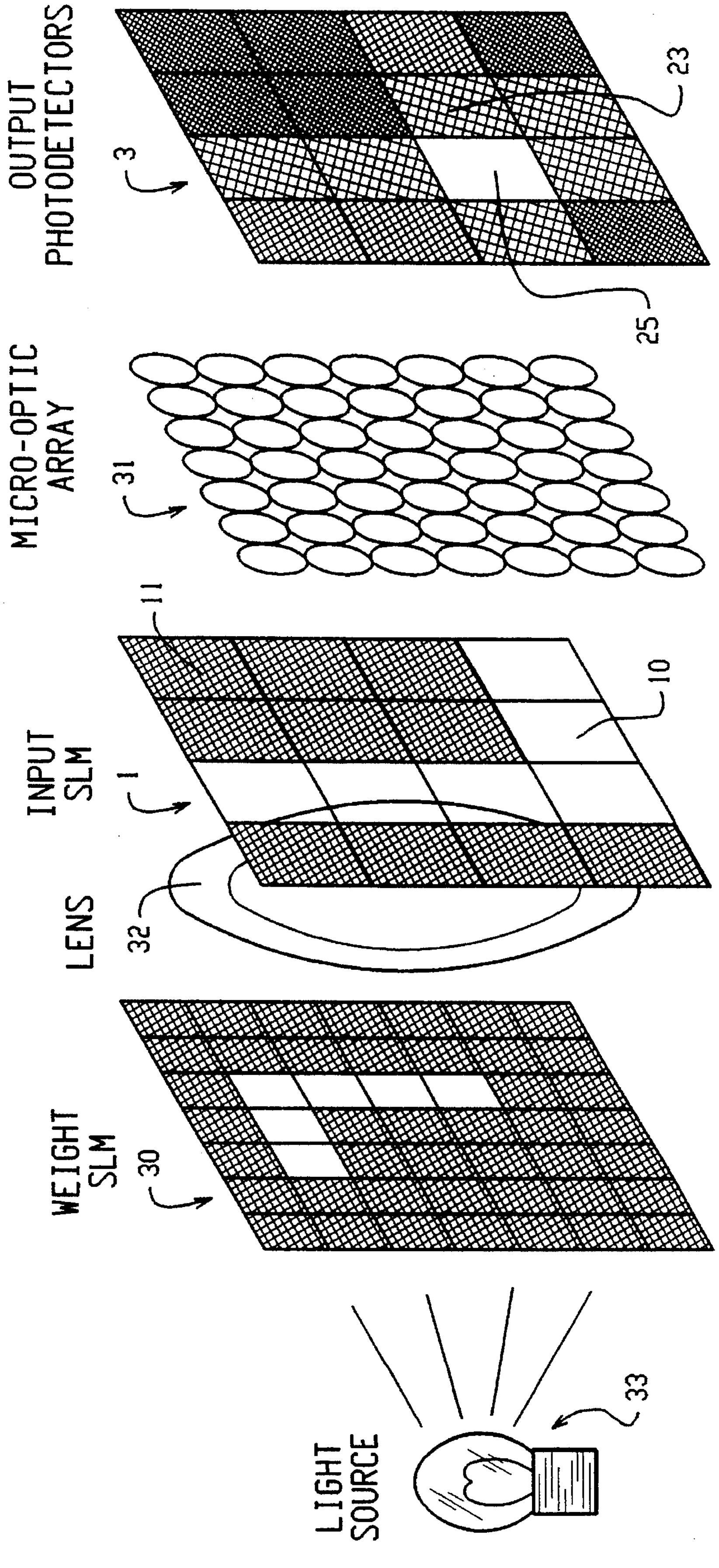
FIG. 3 is a schematic diagram of an optical image processor constituting a second embodiment of the invention.

The optical image processor shown in FIG. 3 has an input SLM 1 and an array of output photodetectors 3 corresponding to those shown in FIGS. 1 and 2. However, the processor of FIG. 3 differs from that shown in FIGS. 1 and 2 in that the SLM and micro-optic array 2 is replaced by a separate weight SLM 30 and a micro-optic array 31 of pin holes or lenses. The array 31 is disposed between the input SLM 1 and the array of photodetectors 3 in substantially the same relative position as the combined SLM and array 2 of FIG. 1. However, the weight SLM 30 is disposed between the input SLM 1 and an incoherent light source 33. The pixels of the weight SLM 30 are imaged by means of a lens 32 or other suitable optical system onto respective elements of the array 31 via the input SLM 1.

Operation of the processor of FIG. 3 during image processing is substantially the same as that of the processor of FIGS. 1 and 2, with each pixel of the weight SLM 30 being imaged onto a respective one of the elements of the array 31 so as to modulate the passage of light therethrough. However, the arrangement of separate elements for the weight SLM 30 and the array 31 avoids the need for fabrication of a hybrid microlens or pin hole shutter device and may also have advantages in correct illumination of the system for power conservation.

Figure 4:
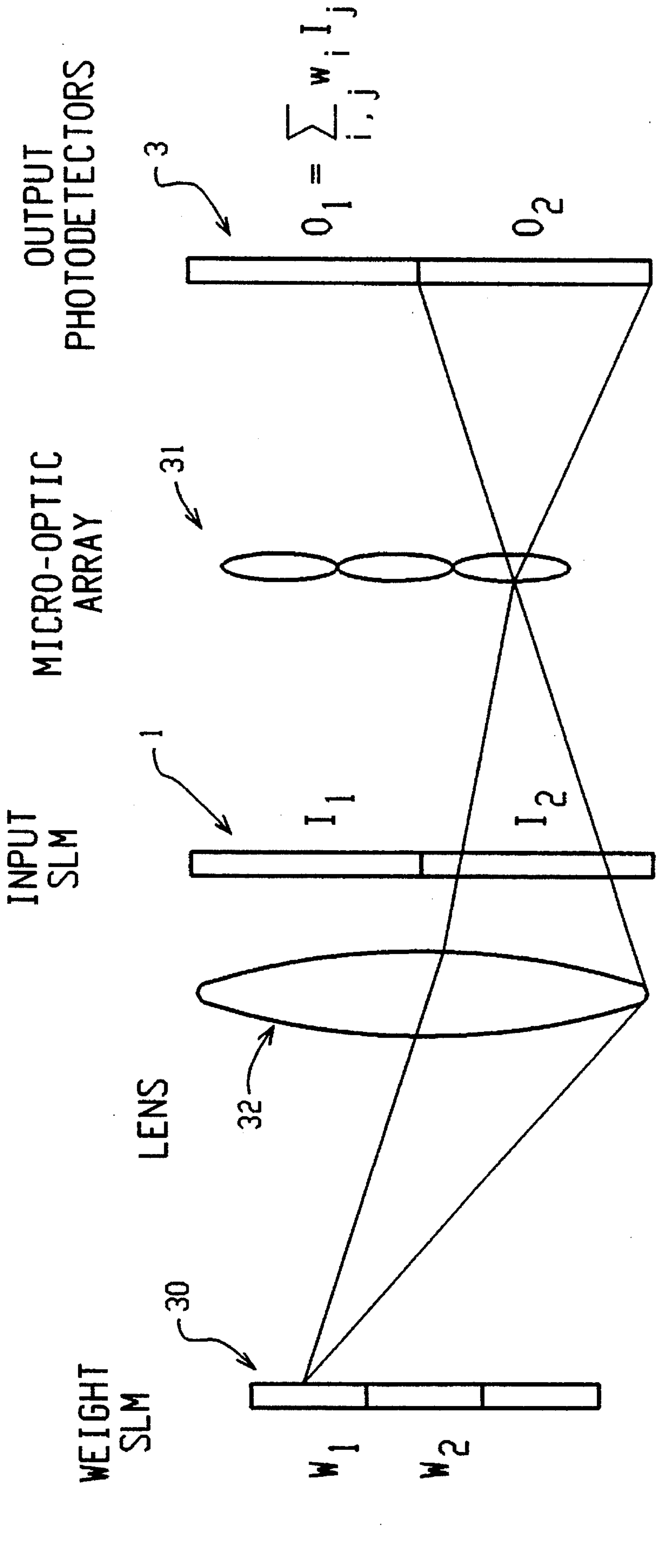
FIG. 4 is cross-sectional diagram of the processor of FIG. 3 illustrating processing and updating.

Further, the arrangement shown in FIG. 3 provides for the possibility of optical parallel updating of the weights represented by the pixels of the weight SLM 30, for instance as disclosed in EP-A-0 579 356, because optical information can be passed forward and backward through the system. This is illustrated in FIG. 4, in which the weight SLM 30 is optically addressed and may be of the ferroelectric liquid crystal type. During processing, light or other optical radiation passes from left to right in FIG. 4. The weights are represented in the pixels of the weight SLM 30 by controllable attenuation $w_1$, $w_2$, . . . and the input image pixels are similarly represented by attenuation coefficients $I_1$, $I_2$, . . . . The outputs $O_1$, $O_2$, . . . of the output photodetectors 3 are formed in accordance with the matrix equation:

$$O=w\times i$$

where O has elements $O_1$, $O_2$, . . . , w has elements $w_1$, $w_2$ . . . , and I has elements $I_1$, $I_2$, . . . .

The output matrix O may then be subtracted by suitable processing electronics or optically from a target matrix to form an error matrix E, which may then be used to modulate light passing in the reverse direction through the processor, for instance by providing an array of light emitters or a light source and a further SLM at the array of output photodetectors 3 such that the optical paths illustrated in FIG. 4 are traversed in the opposite directions. Thus, the returning light is additionally modulated by the input SLM 1, which continues to display the input matrix I so that the light received by the pixels of the weight SLM 30 is represented by the matrix Δw, where:

$$\Delta w = i \times E.$$

By embodying the weight SLM 30 as an optically addressed spatial light modulator, for instance of the ferroelectric type, combined with an amorphous silicon layer for providing photo injection of charge into the ferroelectric liquid crystal, the weight matrix w is automatically optically updated in accordance with the correction matrix Δw. Thus, training of the optical processor may be performed in parallel so as to reduce the training time required.

Multiplexing in the plane of the filter image may be implemented for applications where the filter image contains far less pixels than the input image. In this case, the weight SLM covers most of the pin holes or lenses of the micro-optic array. By replicating the filter image and illuminating such that only areas of comparable size to the "template" are correlated with any one of the replicated templates, the input image can be tested for a predetermined feature on an area-by-area basis in parallel. Such an arrangement prevents wastage of the information storage capacity in the filter plane and allows the numerical aperture of the illumination to be much smaller, which results in a very much larger system in terms of numbers of pixels. The selective illumination may be performed either by a single lens or by a microlens array so as to avoid crosstalk.

Figure 5:
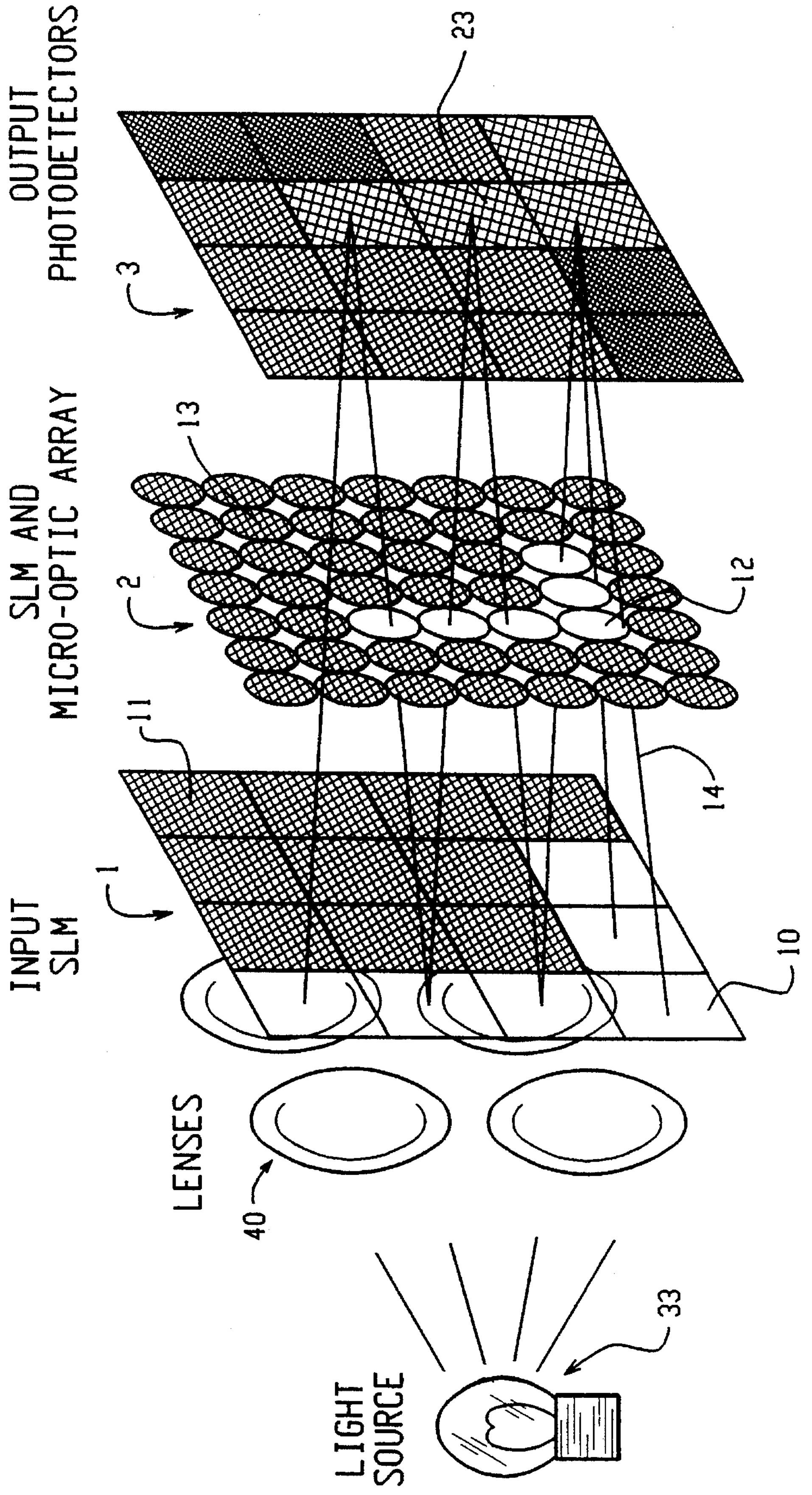
FIGS. 5 and 6 are schematic diagrams of an optical image processor constituting a third and fourth embodiment of the invention.

FIG. 5 shows a processor which may be used to implement such an arrangement. The processor of FIG. 5 differs from that shown in FIGS. 1 and 2 in that illumination is provided via an array of lenses 40. Restricted area self-correlation may also be performed by the processor shown in FIG. 5 such that the extent to which areas within two scenes are shifted relative to each other can be measured. This is particularly relevant to three dimensional interpretation of stereoscopic images, in which objects which are closest to a stereoscopic camera occupy very different positions in the two images. One stereoscopic image is displayed by the filter or weight SLM and the other by the input SLM 1. The size of the area used to look for shifts is then determined by the size of the input microlenses 40. The plane of the output photodetectors 3 then has similar sized areas within which sharp correlation spots appear in the middle when the sub-image is far afield i.e. no relative translation, and shifted for those areas closer to the camera.

Various modifications may be made within the scope of the invention. For instance, the functions of the input SLM and the weight SLM may be reversed so that a pixelated image representing the filter is displayed on the input SLM 1 and the input image is displayed on the weight SLM 30 or on the SLM and micro-optic array 2. Such an arrangement provides easy implementation of bipolar filters, as described hereinbefore, by halving the size and doubling the number of pixels in one dimension in the filter (formerly the input) SLM and the photodetector array for positive and negative channels. Also, optical training may be implemented in a more convenient way using such an arrangement.

It is thus possible to provide an optical image correlator which allows the use of incoherent light. Such an arrangement provides rapid parallel optical processing and is capable of providing optical parallel updating or training. Further, split correlation functionality for large systems or applications in area selective correlation may be provided.

Optical correlation allows parallel computation of correlation between an input image and a template filter for some or all relative positions of the images within the field defined by the input SLM. This allows, for instance, extremely fast feature extraction for robotic vision systems. Further, such optical image correlators may be used in production lines in which a small number of defective items can be recognised amongst a large number of items, for instance irregularly situated on a conveyor belt. Other examples of applications of such an optical image correlator include recognition of vehicles for surveillance purposes and analysis of high resolution images derived from orbiting satellites.

What is claimed is:

1. An optical image correlator comprising:

an array of optical detectors;

first image forming means for forming a first array of X first image picture elements, where X is an integer greater than one;

a set of optical path defining means; and second image forming means for forming a second array of second picture elements, at least one of the first and second image forming means comprising a spatial light modulator each of whose picture elements has an optical transmissivity which is independently controllable, wherein the set of optical path defining means comprises Y optical path defining means, where Y is an integer greater than one, the second array comprises Y second image picture elements, each of which is arranged to modulate the optical path defined by a respective one of the optical path defining means, and each of the optical detectors cooperates with a corresponding subset of the Y optical path defining means to define Zi optical paths between the optical detector and Zi of the first image picture elements, respectively, where Zi is an integer greater than one and less than or equal to X and each subset of the optical path defining means is different from all of the other subsets thereof.

2. A correlator as claimed in claim 1, characterized in that each of the optical detectors is connected to each of the first image picture elements by a respective one of the optical paths so that Zi is equal to X.

3. A correlator as claimed in claim 1, wherein each of the array of optical detectors, the first array, the set of optical path defining means, and the second array is a two dimensional array.

4. A correlator as claimed in claim 2, wherein each of the array of optical detectors, the first array, the set of optical path defining means, and the second array is a two dimensional array, and wherein the array of optical detectors comprises an A×B array, the first array comprises a C×D array, and each of the set of optical path defining means and the second array comprises an (A+C−1)×(B+D−1) array, where A, B, C and D are integers greater than one.

5. A correlator as claimed in claim 1, wherein each of the optical path defining means comprises a converging lens.

6. A correlator as claimed in claim 1, wherein each of the optical path defining means comprises an aperture.

7. A correlator as claimed in claim 1, wherein the first image forming means comprises a first spatial light modulator.

8. A correlator as claimed in claim 7, wherein the first spatial light modulator comprises a liquid crystal device.

9. A correlator as claimed in claim 1, wherein the first image forming means comprises an imaging lens.

10. A correlator as claimed in claim 1, wherein the second image forming means comprises a spatial light modulator.

11. A correlator as claimed in claim 10, wherein the spatial light modulator of the second image forming means comprises a liquid crystal device.

12. A correlator as claimed in claim 10, wherein the spatial light modulator of the second image forming means is optically addressable.

13. A correlator as claimed in claim 1, wherein each of the optical path defining means is disposed adjacent a respective second picture element.

14. A correlator as claimed in claim 13, wherein the set of optical path defining means and the second image forming means are disposed between the array of optical detectors and the first image forming means.

15. A correlator as claimed in claim 1, wherein the set of optical path defining means is disposed between the array of optical detectors and the first image forming means, the first image forming means is disposed between the set of optical path defining means and the second image forming means, and a converging lens is disposed between the first and second image forming means and is arranged to image each of the second picture elements onto a respective optical path defining means.

16. A correlator as claimed in claim 1 further comprising a collimated light source.

17. A correlating system characterized by a plurality of correlators as claimed in claim 1, the correlators being arranged optically in parallel.

18. A system as claimed in claim 17, wherein the correlators are optically independent of each other.

* * * * *